United States Patent [19]

Sakurai et al.

[11] 3,827,713

[45] Aug. 6, 1974

[54] PASSIVE SEAT BELT ASSEMBLY FOR AUTOMOBILE OR THE LIKE

[75] Inventors: Katsuo Sakurai, Toyota; Jiro Chofuku, Yokosuka, both of Japan

[73] Assignee: Toyota Jidosha Kogyo Kabushiki Kaisha, Toyota-shi, Japan

[22] Filed: Dec. 5, 1972

[21] Appl. No.: 312,321

[30] Foreign Application Priority Data
Dec. 8, 1971   Japan.................................. 46-99272

[52] U.S. Cl.............................................. 280/150 SB
[51] Int. Cl............................................. B60r 21/02
[58] Field of Search ............................... 280/150 SB

[56] References Cited
UNITED STATES PATENTS
3,680,883   8/1972   Keppel.......................... 280/150 SB

*Primary Examiner*—Robert R. Song
*Attorney, Agent, or Firm*—Stevens, Davis, Miller & Mosher

[57] ABSTRACT

A passive seat belt for an automobile or the like. A shoulder belt is linked to a guide assembly which, in turn, is linked to a drive means actuated in response to open-close operation of a door and which is mounted on the roof side rail so that it reciprocates to and fro along the rail, and a wrap belt is linked to a guide means mounted at a suitable position on the shoulder belt. Both belts take restrictive positions where passenger is constrained and non-restrictive positions in response to closing and opening of the door.

2 Claims, 6 Drawing Figures

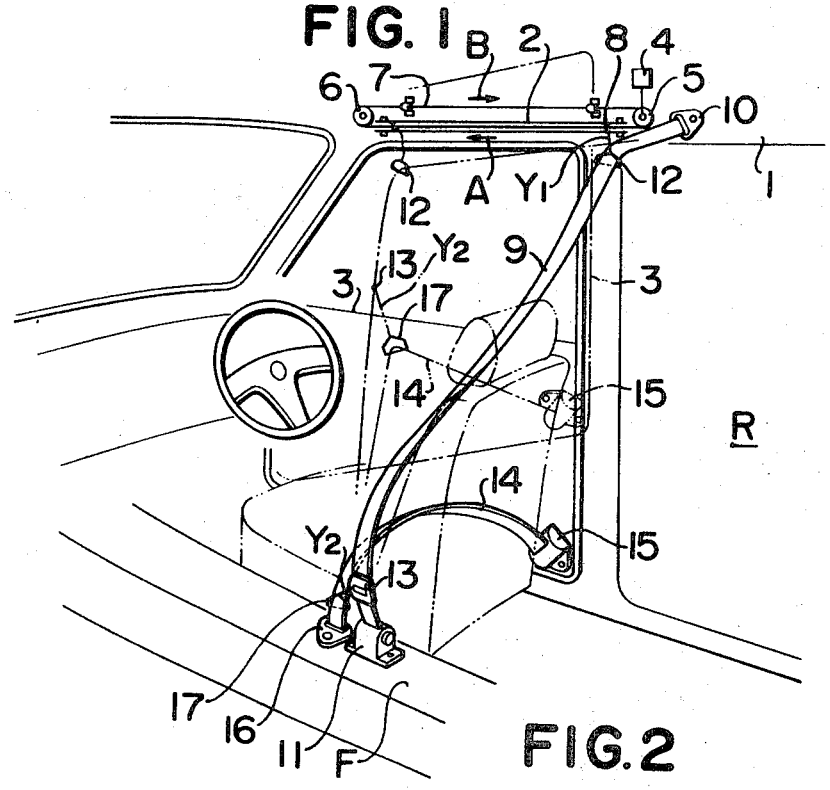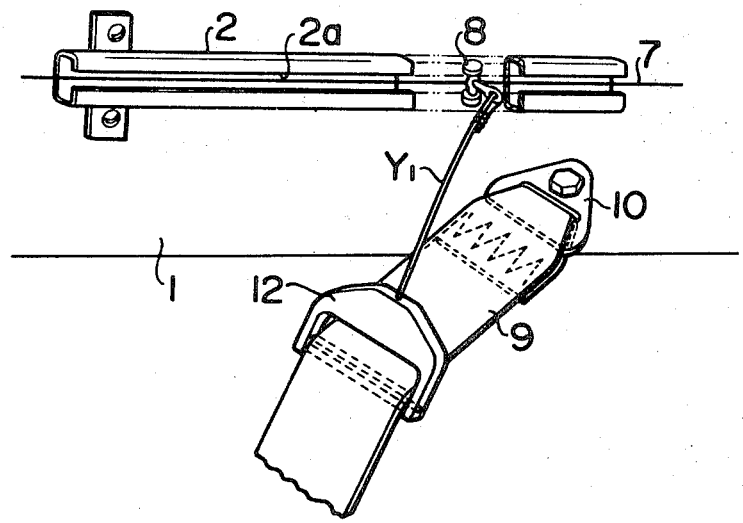

PASSIVE SEAT BELT ASSEMBLY FOR AUTOMOBILE OR THE LIKE

The present invention relates to a possive seat belt assembly with a guide mechanism which actuates a shoulder belt and a wrap belt mounted on a seat of an automobile to two positions in response to door open-close operation, one being a restrictive position where passenger is found and the other being non-restrictive position where passenger is not prevented from getting on and off the car.

It is, therefor, an object of the present invention to provide a novel and improved passive seat belt assembly which enables the automatic movement of both shoulder and wrap belts to either given restrictive and non-restrictive positions without sacrificing space in the car and without interfering driver's operation, and which is easily adaptable for mounting on a special type of car such as hard-top type or the like, and which includes a guide mechanism which is simple in construction and reliable in operation.

Figure 4:
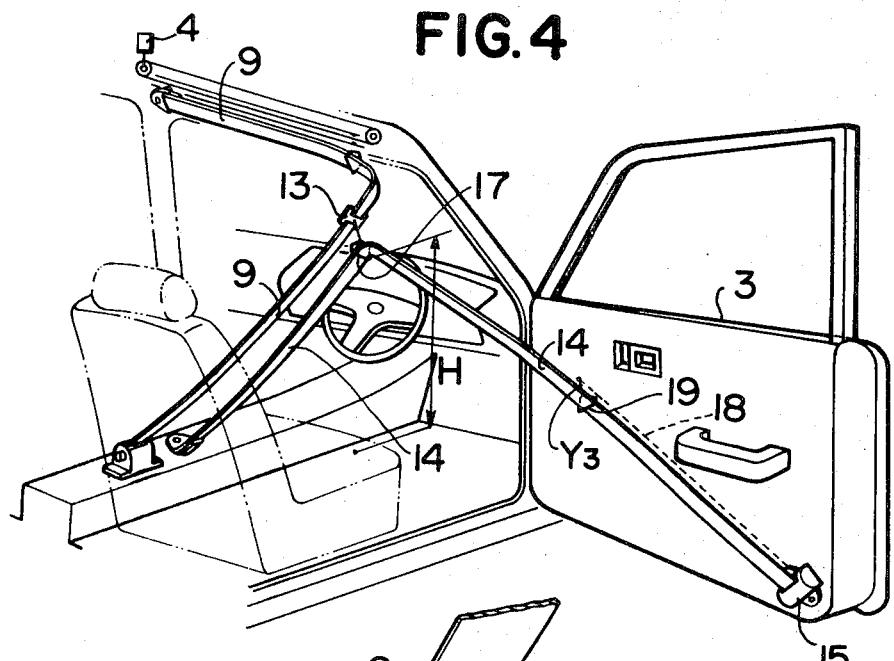
Figure 3:
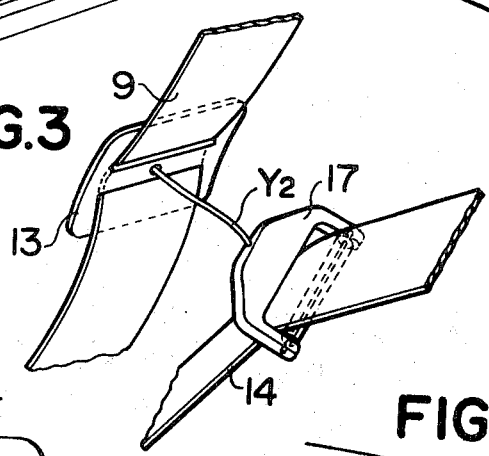
Figure 5:
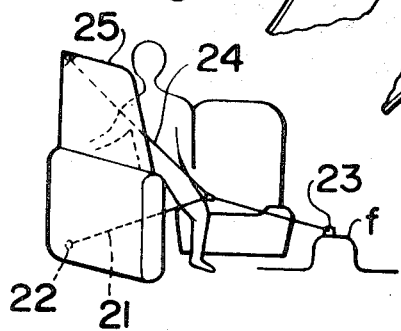
Figure 6:
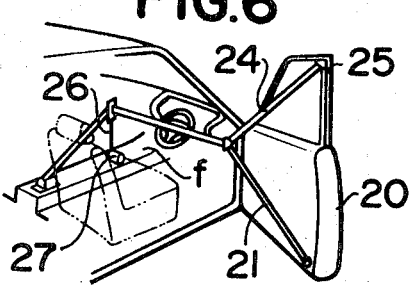

The present invention will now be described in more detail with reference to the accompanying drawings, in which;

FIG. 1 is a perspective view, somewhat schematic, illustrating arrangement and operation of the parts inside a car front seat section in which one embodiment of the present invention is incorporated, FIG. 2 is a perspective view illustrating an operation relationship of a rope in a shoulder belt guide rail to move a shoulder belt, FIG. 3 is a perspective view illustrating relationship of both belts which move with the movement of the shoulder belt, FIG. 4 is a perspective view, taken from the external of the compartment, of a modification of mounting of a wrap belt, FIG. 5 and FIG. 6 show perspective views of prior art guide mechanisms.

Referring now to the drawing, prior art passive seat belt assemblies of the type mentioned above are first explained with reference to FIGS. 5 and 6. In the assembly shown in FIG. 5, a wrap belt 21 has its outer end secured to an anchor 22 fixed at inner rear end of a door 20 and has its inner end secured on center floor (*f*) in the compartment by an anchor 23. A shoulder belt has its outer end secured to a suitable reinforcement mounted at corner of inner rear top of a door frame 25 and has its inner end connected to nearby the center of the wrap belt 21. In the passive seat belt of this type, it is possible to constrain the passenger, but getting on and off of the passenger is interfered substantially because upon getting or and off the knees of the passenger touch the joint with the wrap belt 21 or the shoulder belt 24.

In another prior art assembly as shown in FIG. 6, which is similar to the assembly of FIG. 5 in their constructions, an arm 26 linking with a wrap belt at its tip end is mounted on a center floor (*f*) in the compartment, the arm 26 linking to a motor 27 driven with the open-close operation of a door 20, the arm 26 being swung with a predetermined range of angle by the actuation of the motor 27, so that the wrap belt 21 being guided at the tip end of the arm 26 is lifted to the illustrated position to release constraint of the passenger. In this type of assembly, since the arm 26 is mounted on the center floor (*f*) in the compartment, it may touch an elbow of the driver and hence may interfere with driving operation. Also, in this assembly, since the outer end of the shoulder belt 24 is mounted at inner rear top of the door frame 25, it cannot be mounted on a special type of car such as so-called hard-top type.

According to the present invention, a seat belt assembly with a seat belt guide mechanism which overcomes the above disadvantyes are provided.

The passive seat belt assembly in accordance with the present invention will now be described with reference to the drawings.

FIG. 1 is a perspective view illustrating the arrangement and operation of the parts on inner side of a front section of a car, in which the present invention is incorporated. In this embodiment, mounted longitudinally of a roof side rail 1 in a compartment (R) is a shoulder belt guide rail 2 of channel cross section, and a small but high power motor 4 is mounted on rear end side of the guide rail, the motor being actuated through a limit switch, not shown, in response to open-close operation of a door 3. A rope 7 which reciprocates in the shoulder belt guide rail 2 spans between a drive pulley 5 linked to the motor 4 and a pulley 6 mounted at tip end of the guide rail 2. Secured integrally to the rope 7 is one side of a movable member 8 which moves in the guide rail 2 to guide the shoulder belt, the other side of the member 8 being mounted to project from an opening $2_a$ formed in the guide rail 2. The movable member 8 is so mounted that it lies at rear end of the shoulder belt guide rail 2 when the door 3 is closed.

The passive seat belt of the present invention comprises the shoulder belt 9 and the wrap belt 14, the outer end of the shoulder belt 9 being fixed on the roof side rail at the rear end of the soulder belt guide rail 2 via an anchor 10, and the inner end of the belt 9 bing coupled to a retractor 11 which is a winding means mounted on the center floor (*f*) in the compartment mounted at a position adjacent to the anchor 10 of the shoulder belt 9 is a guide means 12 linked to a wire ($Y_1$) of suitable length extending from the movable member 8 which reciprocates within the shoulder belt guide rail 2, as shown in FIG. 2.

The above shoulder belt guide rail 2, the rope 7, the movable member 8 and the guide means 12 constitute the guide assembly of the shoulder belt 9.

On the other hand, the inner end of the wrap belt 14 is fixed by an anchor 16 to the center floor (*f*) of the compartment at a position adjacent to the retractor mounting position, and the outer end of the belt 14 is linked to a retractor 15 mounted at inner rear bottom of the door 3. Mounted on the belt adjacent to the anchor 16 of the wrap belt 14 is, as shown in FIG. 3, a guide means 17 which is linked by an adjustment means 13 mounted on the shoulder belt 9 on its retractor 11 side and a wire ($Y_2$) of suitable length. Thus, by upward or downward movement of the adjustment member 13 on the shoulder belt 9, the position of the guide means 17 on the wrap belt can be adjusted.

The operation of the above embodiment is now explained step by step.

As shown in FIG. 1 by a chain and double dot line, upon opening the door 3, the motor 4 mounted at the rear end of the shoulder belt guide rail 2 extending longitudinally of the roof side rail 1 is driven by the actuation of the limit switch not shown. The motor rotation causes rightward rotation (as viewed in FIG. 1) of the rope 7 which spans between the drive pulley 5 of the motor 4 and the pulley 6 mounted at the tip end of the guide rail 2. As the rope 7 is moved, the movable member 8 is also moved in the direction as shown by the arrow (A) along the shoulder belt guide rail 2 while pulling the guide means 12 linked to the movable member 8 through the wire ($Y_1$). Since the shoulder belt 9 has its outer end fixed and its inner end linked to the retractor 11, the shoulder belt 9 is guided by the guide means 12 to be drawn out of the retractor 11 and displaced to a position shown by a chain and double dot line 9 in FIG. 1.

The wrap belt 14, on the other hand, is drawn out of the retractor 15 by the movement of the guide means 17 linked to the adjustment means 13 mounted on the shoulder belt 9, in response to the displacement of the shoulder belt 9, and pulled forwardly to take a position shown by a chain and double dot line 14 in FIG. 1.

The motor 4 is deenergized when the door has been fully opened and the movable member 8 has been moved to the extreme end of the guide rail 2. The shoulder belt 9 and the wrap belt 14 then release their constraint to the passenger and take positions where they do not interfere with free getting on and off.

As the door 3 begins to be closed, the motor 4 is driven to move the rope 7 in a return stroke, that is in a direction (B) opposite to the direction (A). Accordingly, the guide means 12 moves along the shoulder belt guide rail 2 and the guide means 17 moves with the adjustment means 13 in a direction to return the shoulder belt 9 and the wrap belt 14 to the restrictive position, both belt 9, 14 being wound into by the retractors 11, 15 so that they occupy the restrictive position when the door has been completely closed. At the end of the return stroke of the guide means 12, the motor 4 is stopped.

FIG. 4 shows another embodiment of the wrap belt 14 in its mounting position, like numerals represinting corresponding parts in the previous embodiment. Mounted at the inner rear bottom of the door 3 is a retractor 15 of the wrap belt 14, and a wrap belt guide rail 18 of channel shape cross section is provided between a point near the retractor 15 and an oblique section at forward top of the door 3. Mounted in the guide rail 18 is a member similar to the movable member 8 in the first embodiment, and the movable member and the guide means 19 on the wrap belt 14 mounted adjacent to the retractor 15 are linked together through a wire ($Y_3$) of suitable length. As in the first embodiment, the guide means 19 is moved along the wrap belt guide rail 18 so that an operation similar to that in the first embodiment takes place by the action of the limit switch in response to the open-close operation of the door 3.

With the arrangement of the present invention, when the door 3 is fully opened, spacing (H) between the center floor (f) of the compartment and the guide means 17 linked to the adjustment means 13 of the shoulder belt 9 is 700–800mm, which is substantially larger compared with the spacing of 350–400mm in the prior art assembly as shown in FIGS. 5 and 6. Thus, an improved assembly which does not touch with knee of the passenger upon getting on and off or seating on and off is provided.

Furthermore, since the guide means, that is, the shoulder belt guide rail 2 and the rope 7 and the movable member 8 in the guide rail 2 as well as major drive members such as the motor 4 for driving the movable member are mounted on top surface of the roof side rail 1 longitudinally thereof in the compartment, and the retractors 11 and 15 having wound the other ends of the shoulder belt 9 and the wrap belt 14 thereinto, respectively, are mounted on the center floor (f) of the compartment and the inner rear bottom of the door 3, both belts 9 and 14 can be advantageously moved in place without reducing dwell space in the compartment.

Since it is not necessary to attach the outer end of the shoulder belt 24 to the corner at the inner rear top of the door frame 25 as in FIGS. 5 and 6, the guide assembly of the present invention can be easily mounted on sashless type car having no door frame, that is, so-called hard-top car. Also, because of its simple construction, no structural failure occurs and releable operation of the assembly is assured. This also brings about cost reduction in manufacture. The assembly can be easily mounted on the front seat opposite to the dirver's seat as well as the rear seat.

What is claimed is:

1. A passive seat belt for an automobile or the like comprising
a guide assembly linked to a drive means which is actuated in response to the open-close operation of a door, said guide assembly including a shoulder belt guide rail mounted on a roof side rail and a movable member mounted on said guide rail reciprocating to and fro there along;
a shoulder belt having its outer end fastened by means of an anchor to the rear end of said shoulder belt guide rail and its inner end disposed through a rectractor on the center floor in the compartment, a first guide means operatively connected to said movable member slidably engaging a rear portion of said shoulder belt;
a wrap belt having its inner end fastened by means of an anchor to the center floor in the compartment and its outer end mounted through a retractor at the inner rear bottom of the door;
an adjustment means mounted in a substantially central position of said shoulder belt extended when the door is opened; and
a second guide means coupled to said adjustment means and slidably engaging the wrap belt,
whereby each of said belts is positioned to a restrictive position and a non-restrictive position of passenger as the door is closed and opened, respectively.

2. A passive seat belt for an automobile or the like in accordance with claim 1 wherein said shoulder belt guide rail of channel shape in cross section is mounted along the length of the roof side rail in a compartment, and a motor which is driven through a limit switch in response to the open-close operation of the door is mounted at the rear end of the guide rail, and a rope which reciprocates in the guide rail spans between a drive pulley coupled to the motor and a pulley mounted at a tip end of the guide rail.

* * * * *